Mar. 13, 1923.
E. P. HARRIS.
TRANSLUCENT MEASURING SCALE.
FILED MAR. 27, 1920.
1,448,533.
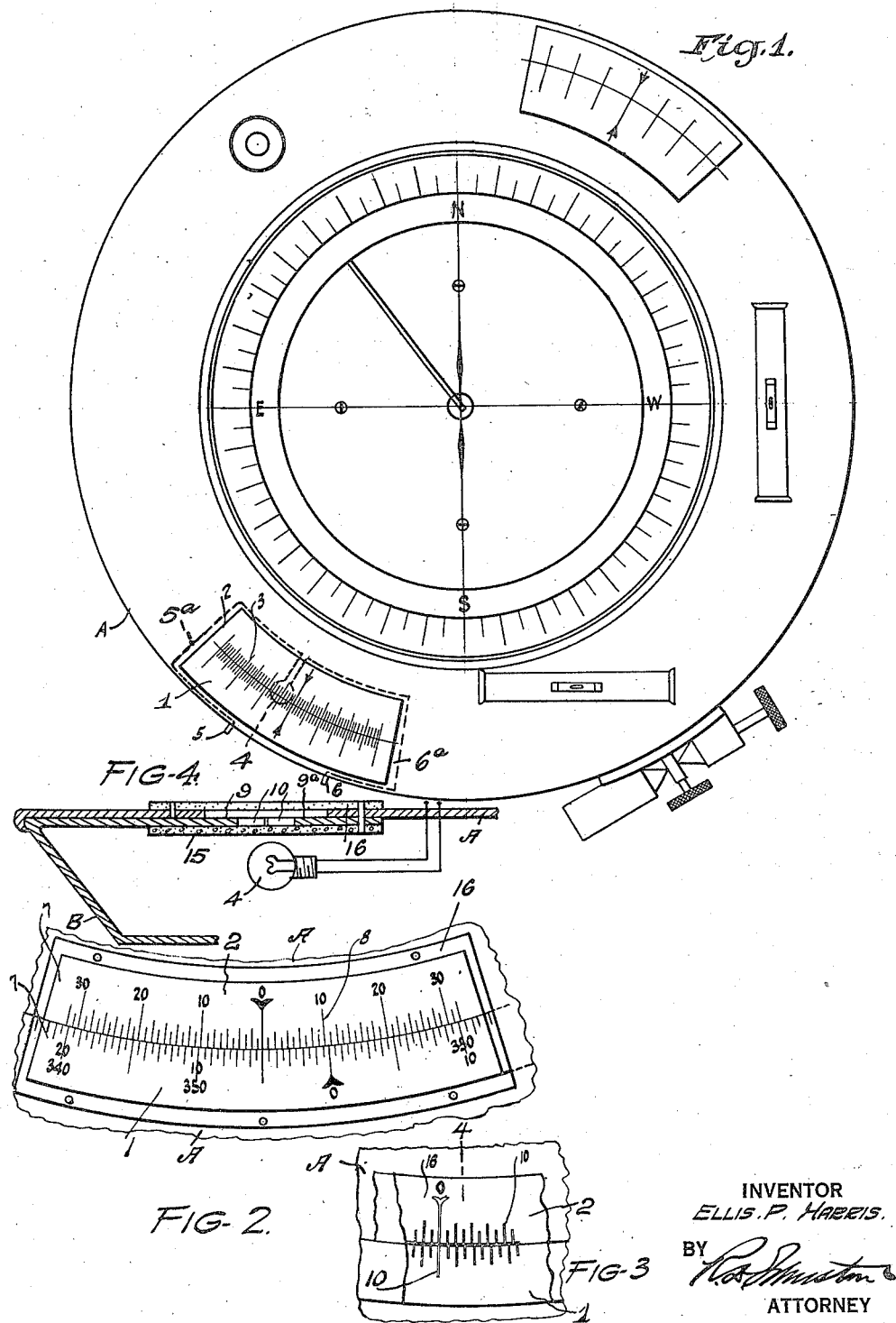
INVENTOR
ELLIS. P. HARRIS.
BY
ATTORNEY Patented Mar. 13, 1923.

1,448,533

UNITED STATES PATENT OFFICE.

ELLIS PHILLIP HARRIS, OF BIRMINGHAM, ALABAMA.

TRANSLUCENT MEASURING SCALE.

Application filed March 27, 1920. Serial No. 369,350.

*To all whom it may concern:*

Be it known that I, ELLIS P. HARRIS, a citizen of the United States of America, residing at Birmingham, in the county of Jefferson and State of Alabama, have invented certain new and useful Improvements in Translucent Measuring Scales, of which the following is a specification.

My invention relates to a translucent measuring scale for all classes of measuring instruments, my object being to perfect a scale which can be illuminated so as to enable it to be read in the dark without distortion from shadows.

My invention is particularly adapted for the measuring scales of surveyors' instruments, transits, sextants, speedometers and the like, and its essential feature is the arrangement of the source of light so as to project its rays through the measuring scale towards the eye of the observer.

My invention can be embodied in many forms such as the provision of a translucent scale with opaque graduations thereon, an opaque scale with translucent graduations thereon, or a metallic plate with the graduations formed by slits through which the rays of light defining the graduations penetrate in direct course to the eye.

My invention will be best understood by reference to the accompanying drawings which form a part of this specification, and which illustrate my invention only in several of its more preferred forms.

According to the drawings:—

Fig. 1 shows my invention applied to a measuring scale of a surveyor's transit, only one scale being shown in detail and this being of an opaque nature with translucent graduations.

In Fig. 2 I illustrate a translucent scale with opaque graduations.

In Fig. 3 I illustrate in enlarged view a section of a measuring scale similar to that shown in Fig. 1, in which the scale is formed in opaque plates having translucent slits forming the graduations.

Fig. 4 is a sectional view taken on the line 4—4 of Fig. 3.

Similar reference numerals refer to similar parts throughout the drawings.

As illustrated in Fig. 1, the surveyor's transit comprises the relatively movable frames A and B and has a scale carried in part by the transit limb 1 on frame B and in part by the vernier 2 forming part of frame A, the scale being in two sections one carried by the limb and one by the vernier and being of opaque substance having translucent graduations 3 therein. An electric light or other source of illumination 4 is arranged below the measuring scale and provided with electric contacts 5 and 6 having suitable circuits $5^a$ and $6^a$ carried by the frame A and leading to the electric light 4. The contacts are disposed so as to be convenient to be touched to the terminals of batteries in the hand for flashing the light and illuminating the scale.

In Fig. 2 I show a similar scale with the exception that the scale sections are formed of translucent substance 7 with opaque graduations 8 thereon, the light 4 being arranged under the scale as in Fig. 1 and adapted to be illuminated in the same manner.

In Fig. 3 the scale sections are formed in metallic or opaque plates 9 and $9^a$, one of which is carried by frame B and the other by frame A, said plates having the graduations formed therein by narrow radial slits 10, there being a ground glass 15 between the light 4 and the slits and a clear glass cover 16 over the slits to keep out the dust, said glass covers being riveted to the frame A. In this case, as in the others, the numbers marking the scale graduations are also made opaque or translucent or formed by slits or slots so that the whole scale can be read by means of the light 4 under it.

In practice, it will be observed that the light in this case passes through the measuring scale to the eye of the observer and I thus avoid any possibility of distorting shadows. I eliminate the necessity of overhead clearance because of the added light to throw the rays onto the scale of the instrument, and I simplify the manner of attachment and the safety of the light from damage.

My invention is of particular importance for use in mining instruments, navigating instruments and indicating instruments for automobiles, trains and the like.

This invention is not intended to be restricted in scope to the specific embodiments shown, but contemplates such modifications as come within the spirit and scope of the claims.

Having thus described my invention, what I claim as new and desire to secure by Letters Patent, is:—

1. In a measuring instrument, an opaque portion thereof provided with a measuring scale having its graduations formed by closely associated fine slits, and means to project rays of light therethrough directly to the eye of the user, thereby confining the light transmitted to the eye wholly to the undistorted non-deflected rays passing through said slits.

2. In a transit, an illuminated scale comprising relatively movable opaque elements provided along their adjacent edges with narrow slits arranged and associated to form the graduations of a scale, and means to project rays of light through said slits to the eye of the operator.

3. As an article of manufacture, a transit having a vernier and a limb movable relatively to the vernier, both vernier and limb along adjacent edges being slitted radially of their axis to form graduations of a scale for length of degrees and minutes, means mounted under the limb to project light upwardly through said slits to produce a luminous scale, and a glass cover for the slitted scale.

In testimony whereof I affix my signature.

ELLIS PHILLIP HARRIS.

Witness:
NOMIE WELSH.